United States Patent [19]

Bolyard et al.

[11]  4,397,476
[45]  Aug. 9, 1983

[54] COLLAPSIBLE TRAILER

[76] Inventors: Philip B. Bolyard; Patricia A. Bolyard, both of 1408 18th Ave., NW., Minot, N. Dak. 58701

[21] Appl. No.: 233,127

[22] Filed: Feb. 10, 1981

[51] Int. Cl.³ .............................................. B62D 63/06
[52] U.S. Cl. ................................... 280/656; 280/80 B; 296/27
[58] Field of Search .................. 280/656, 639, 438 R, 280/491 D, DIG. 2, 42, 80 B; 296/27; 414/556

[56] References Cited

U.S. PATENT DOCUMENTS

| | | | |
|---|---|---|---|
| 2,209,804 | 7/1940 | Ashley | 180/DIG. 2 |
| 2,706,881 | 4/1955 | McDonald | 280/656 X |
| 2,981,548 | 4/1961 | Taylor | 280/656 X |
| 3,134,607 | 5/1964 | Doll | 280/656 X |
| 3,139,288 | 6/1964 | Peterson | 280/656 |
| 3,194,578 | 7/1965 | Kiecker | 280/656 X |
| 4,232,879 | 11/1980 | Boxrud | 280/656 |
| 4,301,873 | 11/1981 | Baxter | 280/656 X |

Primary Examiner—David M. Mitchell
Assistant Examiner—Michael Mar
Attorney, Agent, or Firm—Harvey B. Jacobson

[57] ABSTRACT

A full trailer frame is provided including an elongated central member and a pair of opposite end transverse members. The elongated central member is longitudinally extendible and retractable and each end of each transverse member has the base end of a support arm pivotally supported therefrom for angular displacement about an upstanding axis between an extended position with the support arm free end extending outwardly of the corresponding transverse member end and a folded position closely paralleling the central member and projecting toward the remote end of the central member. The free ends of the support arms have wheel journalling spindles pivotally mounted thereon for oscillation about upstanding axes with the spindles being swingable between first positions with the spindles generally paralleling the corresponding support arm and projecting endwise outwardly of the free end thereof and second positions with the spindles disposed at generally right angles relative to the corresponding support arms and projecting laterally outwardly therefrom when the support arms are in the folded position. The spindles may be releasably locked in the first and second positions thereof whereby the trailer may be moved laterally or longitudinally when the support arms are in the extended positions and the trailer may be moved longitudinally when the support arms are in the folded positions.

8 Claims, 11 Drawing Figures

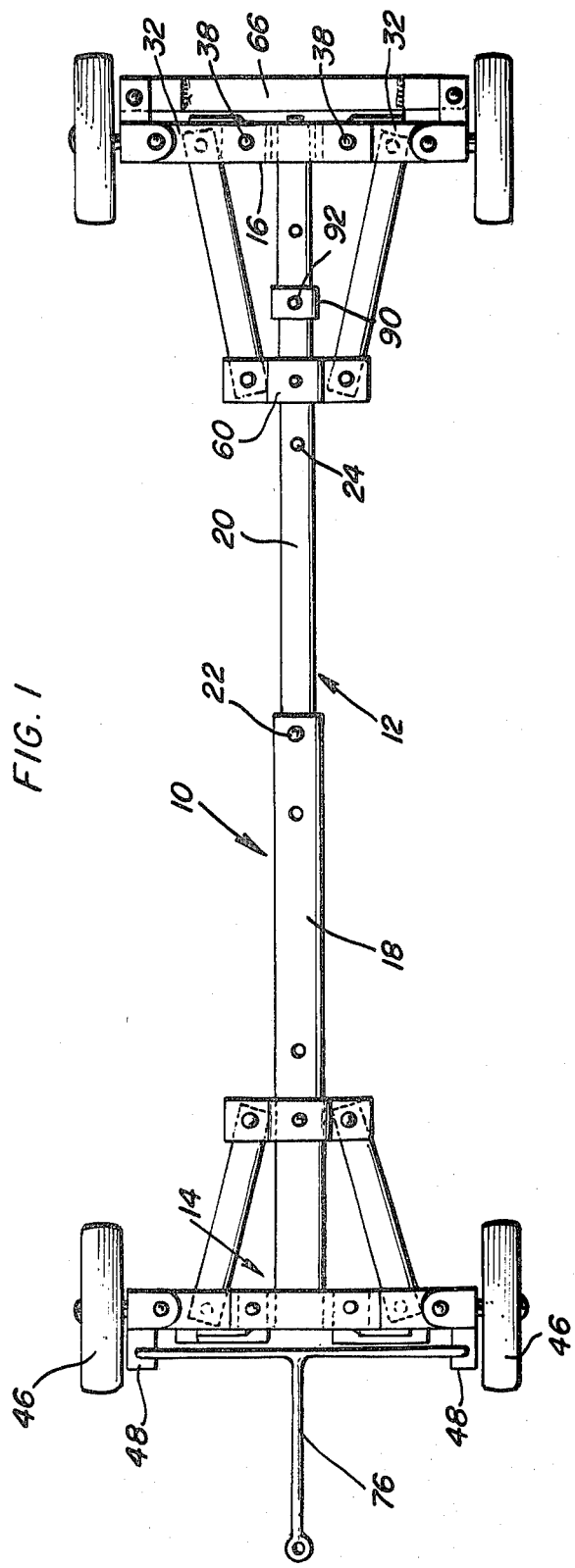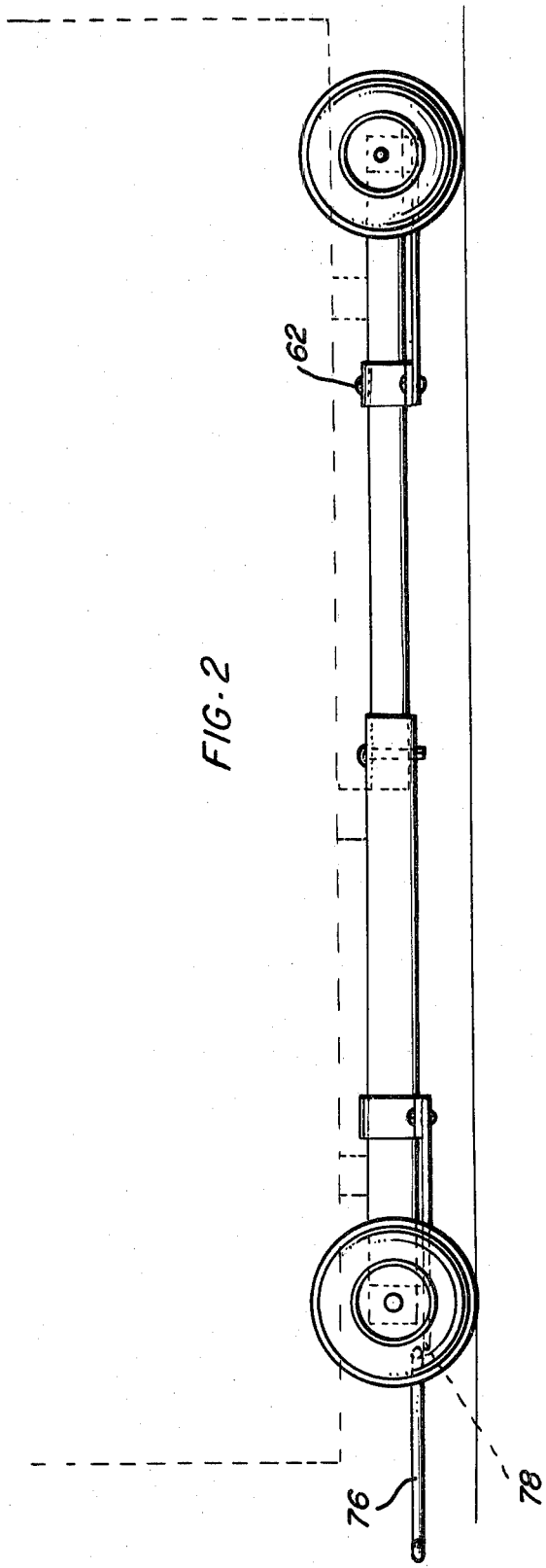

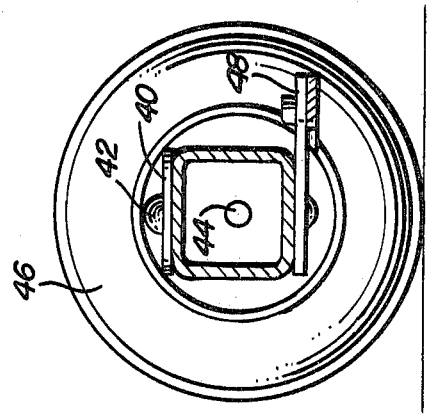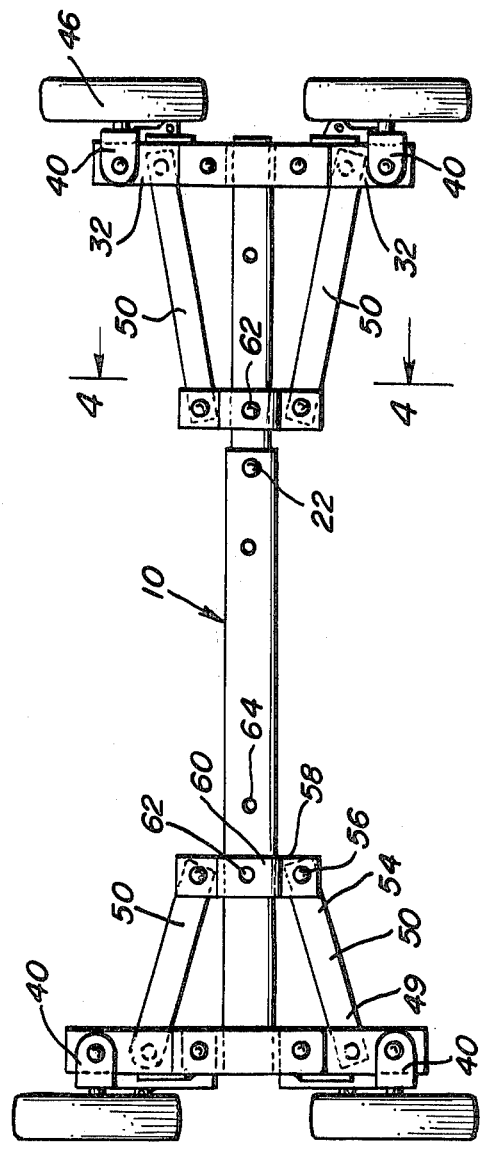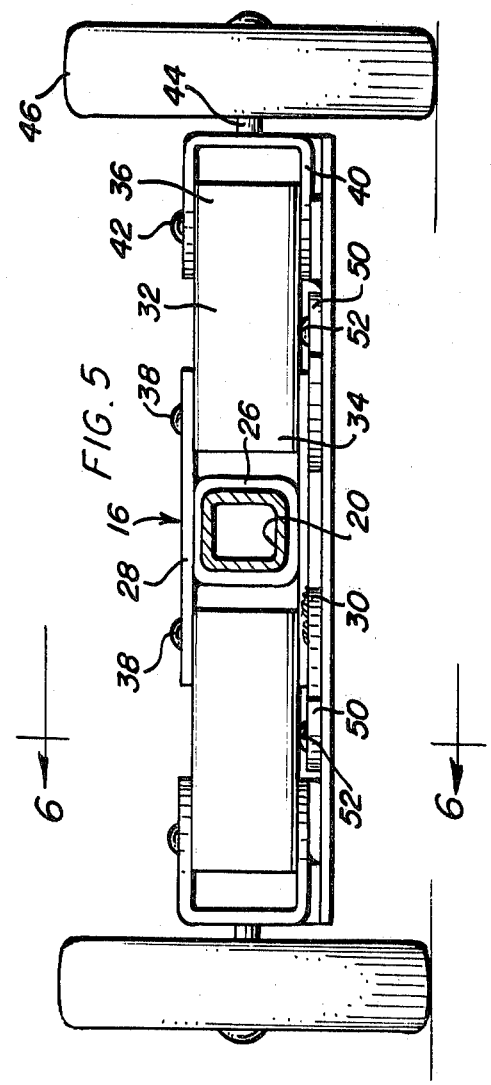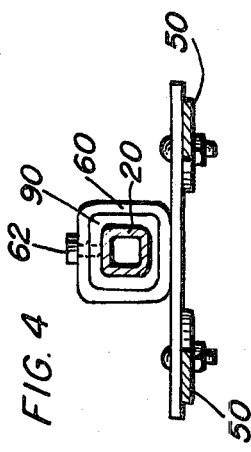

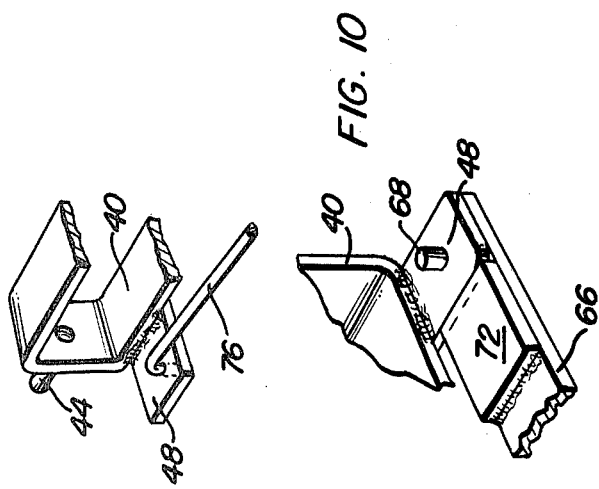
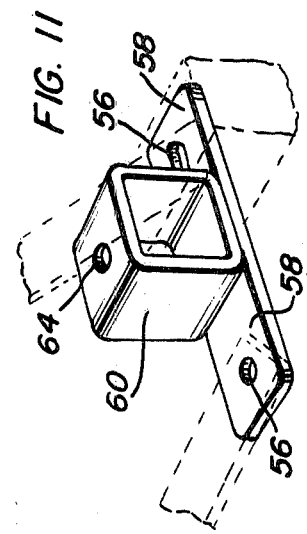
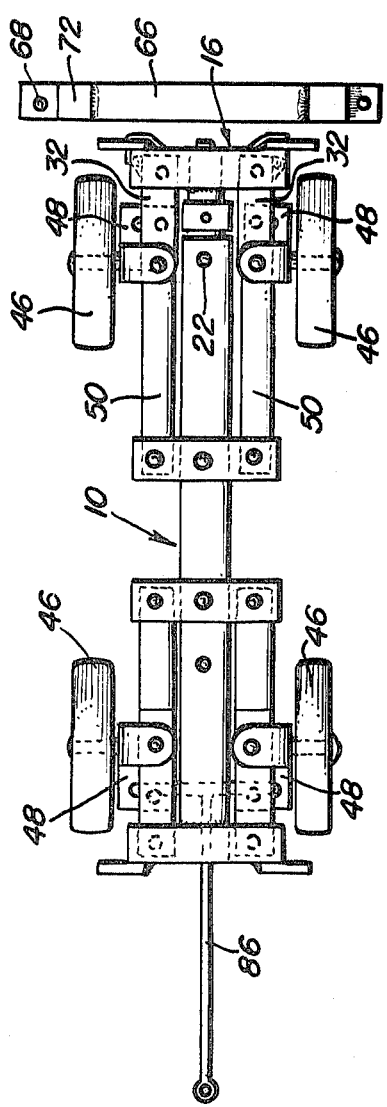
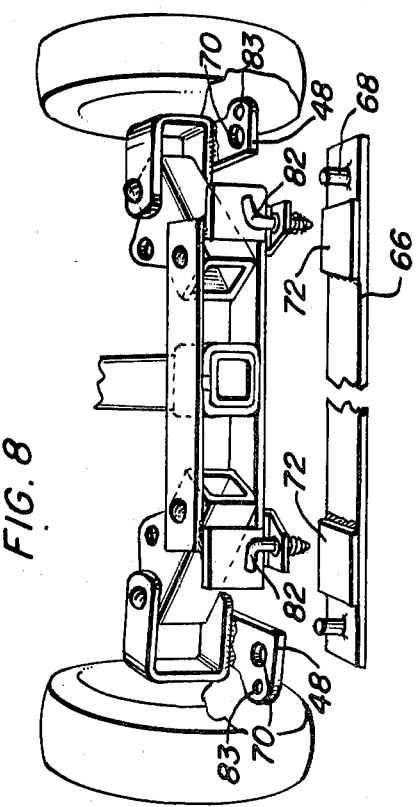

COLLAPSIBLE TRAILER

BACKGROUND OF THE INVENTION

Various persons, including sportsmen and sportswomen, occasionally have a need for a lightweight trailer which may be stored and transported in a compact state.

Campers and boaters are two examples of persons who frequently, or at least occasionally, have need for such a trailer. A camper may use such a trailer for transporting camping equipment from a vehicle parking area to a remote camping site and a boater may use such a trailer for transporting a lightweight fishing boat or the like from a vehicle parking area to a remote water side site. Still further, a lightweight trailer may also be utilized as a dolly for transporting reasonably heavy and bulky loads in other environments. Accordingly, a need exists for a lightweight, collapsible and maneuverable trailer. Although various forms of lightweight and maneuverable chassis as well as other wheeled frames of the telescopic type heretofore have been provided such as those disclosed in U.S. Pat. Nos. 3,899,037, 3,367,675, 3,330,574, 3,100,653 and 729,394, these previously known forms of lightweight and collapsible wheeled chassis are not constructed in a manner which particularly well adapts them for use in many different environments.

BRIEF DESCRIPTION OF THE INVENTION

The trailer of the instant invention comprises a full trailer including opposite side front and rear wheels supported from the trailer chassis for extension and retraction laterally of the chassis. In addition, the chassis is longitudinally extendible and the chassis wheels may be positioned at opposite sides of opposite ends of the trailer chassis with the wheels journaled about horizontal axes extending longitudinally of the chassis. In this manner, the trailer may be moved laterally or may be utilized to support extremely wide loads which must be moved in a direction at generally right angles relative to their width.

The trailer may be longitudinally extended to a length of approximately 7 to 8 feet and may be lengthwise retracted to a length of between $3\frac{1}{2}$ and $4\frac{1}{2}$ feet. In addition, the width of the trailer when the latter is collapsed laterally is approximately one-half the width of the trailer when the trailer is laterally extended. Accordingly, it may be appreciated that the trailer may be collapsed into a reasonably compact state for storage and transport and yet expanded into a trailer of considerable dimensions for supporting various loads.

The main object of this invention is to provide a trailer chassis which may be collapsed for compact storage and transport.

Another object of this invention is to provide a collapsible full trailer chassis in accordance with the preceding object and constructed in a manner whereby the chassis may be transversely as well as longitudinally collapsed.

Still another object of this invention is to provide a full trailer chassis of the collapsible type wherein the wheels thereof are maintained in their proper orientation when the trailer is collapsed thereby enabling the collapsed trailer to be moved on its own wheels.

Another very important object of this invention is to provide a trailer of the collapsible type and wherein, when the trailer is extended, the wheels of the trailer may be alternately positioned for longitudinal movement of the trailer or lateral movement of the trailer.

A final object of this invention to be specifically enumerated herein is to provide a collapsible trailer construction in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the trailer chassis of the instant invention with the chassis in an extended position;

FIG. 2 is a side elevational view of the assemblage illustrated in FIG. 1;

FIG. 3 is a top plan view of the trailer chassis in a partially longitudinally collapsed and fully transversely extended state and with the wheels of the trailer arranged for lateral movement of the trailer chassis as opposed to longitudinal movement;

FIG. 4 is an enlarged, transverse, vertical sectional view taken substantially upon the plane indicated by the section line 4—4 of FIG. 3;

FIG. 5 is an enlarged, transverse, vertical sectional view illustrating the chassis rear end transverse member and the associated wheels;

FIG. 6 is a vertical sectional view taken substantially upon the plane indicated by the section line 6—6 of FIG. 5;

FIG. 7 is a top plan view of the trailer chassis in a fully longitudinally and transversely collapsed state;

FIG. 8 is a fragmentary, perspective view of the rear end of the trailer chassis illustrating the structure by which the rear wheels may be releasably secured in alternate positions for longitudinal and lateral movement of the trailer;

FIG. 9 is a fragmentary, perspective view of one of the front wheel spindle members;

FIG. 10 is a fragmentary, perspective view illustrating the manner in which a connecting member may be secured between the rear spindle for maintaining the latter in position for longitudinal movement of the trailer; and FIG. 11 is a fragmentary, perspective view illustrating the manner in which the spindle supporting support arms may be swung between extended and retracted positions and braced relative to the main longitudinal member of the trailer frame.

DETAILED DESCRIPTION OF THE INVENTION

Referring now more specifically to the drawings, the numeral 10 generally designates the collapsible trailer of the instant invention. The trailer 10 includes an elongated longitudinal central structural component referred to in general by the reference numeral 12 and a pair of opposite end transverse structural members referred to in general by the reference numerals 14 and 16. The central structural component 12 includes a first large dimension square tube 18 and a second small dimension square tube 20. One end portion of the small tube 20 is slidably telescoped into one end portion of the large tube 18 and the tubes 18 and 20 may be secured in various extended and retracted positions through the utilization of a locking pin 22 passed through suitable sets of vertically alignable bores 24 formed in both the large tube 18 and the small tube 20.

Each of the transverse structural members 14 and 16 comprises a base sleeve 26 telescoped over and secured in position on the corresponding square tube and including a pair of upper and lower transverse plates 28 and 30 supported therefrom and projecting longitudinally outwardly from opposite sides of the corresponding square tube. A pair of tubular support arms 32 are supported from the opposite ends of each transverse structural member 14 and 16 and each support arm 32 includes a base end 34 and a free end 36. The base ends 34 of the support arms 32 are pivotally supported between corresponding ends of upper and lower transverse plates 28 and 30 by pivot pins 38 and each of the free ends 36 includes a horizontally opening and generally U-shaped spindle assembly 40 pivotally supported therefrom by a pivot pin 42. Each spindle assembly 40 includes an outwardly projecting spindle 44 upon which an associated wheel 46 is journaled.

Each of the spindle assemblies 40 includes a right angle steering arm 48 for a purpose to be hereinafter more fully set forth and the longitudinal midportion of each support arm 32 has one end 49 of a corresponding brace arm 50 pivotally supported from the underside thereof by a suitable fastener 52. The second end 54 of each brace arm 50 is pivotally attached as at 56 to a corresponding outwardly projecting tab 58 carried by an associated sleeve 60 slidable on the corresponding square tube and releasably secureable in adjusted position therealong through the utilization of a latch pin 62 secured through registrable bores 64 formed in the square tubes 18 and 20 and in the sleeve 60.

The steering arms 48 carried by the rear wheels 46 supported from the small square tube 20 may be interconnected through the utilization of an elongated connecting member 66 having upwardly projecting pins 68 secureable through apertures 70 formed in those steering arms 48. The connecting member 66 includes opposite end blocks 72 with which the associated steering arms are abuttingly engageable to thereby maintain the associated support arms 32 and spindle assemblies 40 in the positions thereof illustrated in FIG. 1 of the drawings, whereby the trailer 10 may be moved longitudinally.

A T-shaped pulling and steering tongue 76 is provided and includes downturned opposite end portions 78, see FIG. 2, receivable through the apertures 70 formed through the forward steering arms 48 and the tongue 76 may therefore be utilized not only to pull the trailer 10, but also to cause steering movement of the front wheels 46 of the trailer 10.

With attention now invited more specifically to FIGS. 3 and 8 of the drawings, it may be seen that the spindle assemblies 40 may be pivoted to positions with the wheels 46 disposed for lateral movement of the trailer 10 and each of the transverse structural members 14 and 16 includes locking pins 82 which are receivable through the small apertures 83 in the steering arm 48 in order to lock the spindles 40 in the positions thereof illustrated in FIG. 3.

As may be seen from FIG. 7 of the drawings, a steering and pulling tongue 86 of considerably less width may be utilized in conjunction with the front steering arms 48 when the trailer 10 is in a fully collapsed position and that the front wheels 46 of the trailer 10 still maintain some steering capacity. In addition, a connecting member (not shown) similar to but shorter than the connecting member 66 may be utilized to interconnect the rear steering arms 48 when the trailer 10 is in the fully collapsed position illustrated in FIG. 7 and to thereby maintain the rear wheels 46 in position for longitudinal movement of the trailer 10 when the latter is fully collapsed.

As further may be seen from FIG. 7 of the drawings, the support arms 32 are collapsed closely alongside the central structural component 12 and the brace arms 50 are similarly disposed when the trailer 10 is fully collapsed. However, when the trailer is fully laterally extended, as illustrated in FIG. 1, the support arms 32 extend endwise outwardly of the corresponding transverse member ends. The sleeves 60 are shifted longitudinally of the corresponding large and small tubes and secured in position by the latch pins 62 in order to maintain the brace arms 50 in oppositely inclined positions bracing the support arms 32 in their extended positions. The sleeves 60 may also be latched in retracted positions by the latch pins 62 when the sleeves 60 are in the positions thereof illustrated in FIG. 7 with the brace arms 50 and support arms 32 disposed generally closely parallel to the opposite sides of the central structural component 12, see FIG. 7.

It will be noted from a comparison of FIGS. 1, 3 and 7 of the drawings that the central structural component 12 may be releasably secured in either a fully extended position as illustrated in FIG. 1, a fully collapsed position as illustrated in FIG. 7d or a partially collapsed position such as that illustrated in FIG. 3. Also, it will be seen that the sleeve 60 at the rear end of the trailer 10 has a sleeve shim 90 received and secured therein when the rear sleeve 60 is telescoped from the large dimension tube 18 onto the small dimension tube 20. The sleeve shim 90 has an aperture 92 formed therein registrable with the corresponding aperture formed in the small dimension tube 20 and therefore may receive the corresponding latch pin 62 therethrough. When the trailer 10 is in the full longitudinally collapsed position thereof illustrated in FIG. 7, the sleeve shim 90 merely rest upon the rear extremity of the small dimension tube 20 immediately forward of the corresponding transverse structural member 16.

Also, when the wheels 46 are retracted inboard, as shown in FIG. 7, the spindles 44 are swung in a manner reducing the wheel base of the trailer 10 and when the wheels 46 are extended to their outboard positions of FIG. 1, the wheel base of the trailer is increased.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A collapsible trailer including an elongated central structural component, a pair of transverse structural members mounted to the opposite ends of said central structural component, a pair of support arms including base and free ends pivotally attached at the base ends thereof to the opposite ends of each transverse structural member for swinging about upstanding axes between extended positions with their free ends projecting outwardly of the corresponding transverse structural member end, and folded positions closely paralleling said central component and projecting toward the remote end of the central component, a wheel spindle pivotally supported from the free end of each arm for angular displacement between a first position with said spindle generally paralleling the corresponding arm and a second position with the spindle disposed at generally right angles relative to the corresponding arm, said support arms being swingable between said folded and extended positions independent of angular displacement of said wheel spindle relative to said support arms, means releasably connected between said support arms and shiftable along said central structural member for selectively releasably securing said support arms in said extended positions and folded positions.

2. The combination of claim 1 wherein the spindles pivotally supported from the ends of one of said transverse members include steering arms projecting outwardly therefrom in a direction extending longitudinally of said central structural component and outwardly of the corresponding central component end when the last mentioned spindles are disposed in the second positions thereof, and a tongue structure pivotally connected between the free ends of said steering arms.

3. The combination of claim 2 including means removably connectable between the spindles of the other of said transverse members when the last mentioned spindles are in the second positions thereof and the corresponding support arms are in the extended positions.

4. The combination of claim 1 wherein said elongated central component includes relatively extendable and retractable opposite end portions from which said transverse members are supported, and means operative to releasably secure said opposite end portions in the extended and retracted positions thereof.

5. The combination of claim 4 wherein the spindles pivotally supported from the ends of one of said transverse members include steering arms projecting outwardly therefrom in a direction extending longitudinally of said central structural component and outwardly of the corresponding central component end when the last mentioned spindles are disposed in the second positions thereof, and a tongue structure pivotally connected between the free ends of said steering arms.

6. The combination of claim 5 including means removably connectable between the spindles of the other of said transverse members when the last mentioned spindles are in the second positions thereof and the corresponding support arms are in the extended positions.

7. A collapsible trailer including an elongated longitudinal central component and opposite end transverse components supported from the opposite ends of said central component and projecting outwardly of opposite sides of said central component, each of said transverse components having a spindle assembly associated with each end thereof with each spindle assembly including a horizontal spindle upon which a support wheel is journaled, support means supporting each spindle assembly from the corresponding transverse component end for selective shifting between a laterally retracted inboard position with the corresponding spindle disposed transverse to said central component and a laterally extended outboard position with the corresponding spindle disposed transverse to said central component, said support means including means operative to shift said spindles, during movement between said inboard and outboard positions, longitudinally of said frame to decrease and increase, respectively, the wheel base of said trailer as the track thereof is decreased and increased, said support means including means mounting each of said spindles for manual angular displacement about an upstanding axis relative to the corresponding support means, to thereby enable each of said spindles to be adjusted transverse to said central component when said spindles are in both the retracted and extended positions.

8. The combination of claim 7 wherein said support means includes means operative to also allow pivoting of said spindle assemblies, when the latter are in their outboard positions, to positions with the spindles disposed longitudinally of said central component and projecting endwise outwardly of the corresponding trailer frame end beyond the corresponding transverse component.

* * * * *